(12) United States Patent
John et al.

(10) Patent No.: US 6,484,945 B1
(45) Date of Patent: Nov. 26, 2002

(54) SMART CARD HAVING CIRCUIT DISABLING

(75) Inventors: Laurence John, East Molsey (GB); Paul Crichton, Newbury (GB); Steven Heath, Newton Longville (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/626,518

(22) Filed: Jul. 27, 2000

(30) Foreign Application Priority Data

Dec. 23, 1999 (GB) .............................................. 9930580

(51) Int. Cl.⁷ .............................................. G06K 19/00
(52) U.S. Cl. ........................ 235/487; 235/489; 235/492
(58) Field of Search ................................. 235/487, 489, 235/492

(56) References Cited

U.S. PATENT DOCUMENTS 3,699,311 A  * 10/1972 Dunbar .................... 235/61.11
4,639,585 A  * 1/1987 Haghiri-Tehrani et al. .. 235/492
4,829,166 A  * 5/1989 Froelich ..................... 235/379
5,031,026 A  * 7/1991 Ueda ........................... 357/74
6,068,192 A  * 5/2000 McCabe et al. ............ 235/487
6,073,856 A  * 6/2000 Takahashi ................... 235/492
6,386,459 B1 * 5/2002 Patrice et al. ............... 235/439

* cited by examiner

Primary Examiner—Michael G. Lee
Assistant Examiner—Seung H. Lee
(74) Attorney, Agent, or Firm—Randall S. Vaas

(57) ABSTRACT

A Smart Card has an electronic circuit connected to a source of potential capable of destroying at least a portion of the electronic circuit. The potential is normally short circuited, but the path of the short circuit traverses a frangible portion of the card. When the portion is broken, so potential from the source is applied to destroy the portion of the electronic circuit.

12 Claims, 1 Drawing Sheet

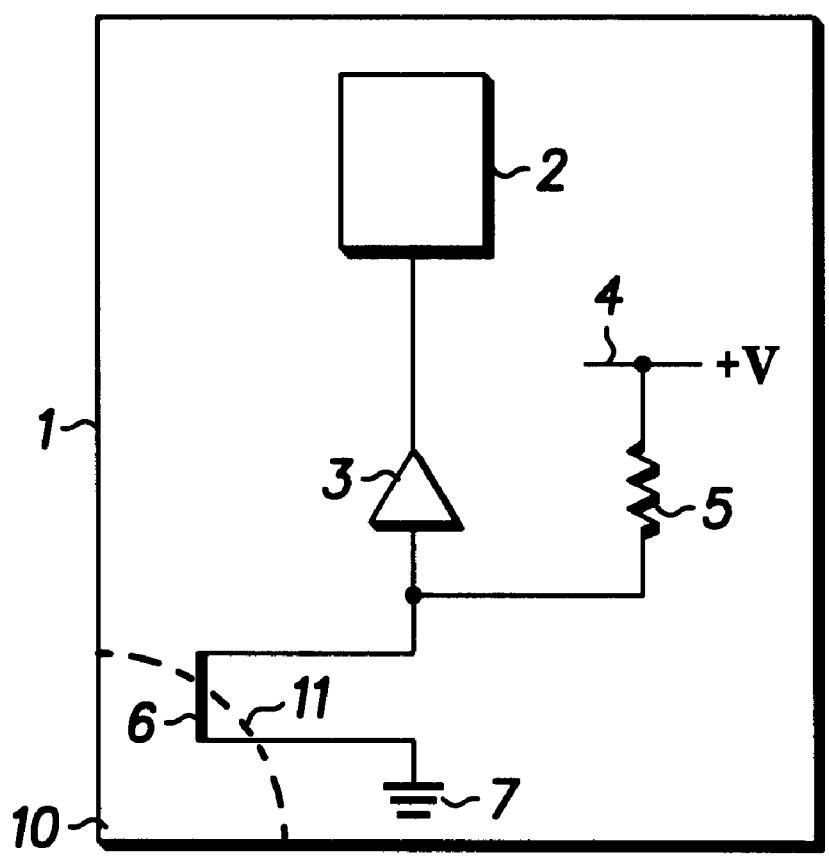

SMART CARD HAVING CIRCUIT DISABLING

BACKGROUND OF THE INVENTION

1. Field of the Invention

This invention relates to a Smart Card which is a card similar in size and feel to a credit card and which is capable of storing information in an integrated microprocessor chip located within the body of the card.

2. Background of the Invention

An integrated micro-processor chip may hold a variety of different information, for example monetary value used for retail and vending machines, secure information and applications relating to medical or health care records. Furthermore such cards may be used in a new category of mobile phone known as Dual Smart Card Phone which enables consumers to access an almost limitless range of services such as mobile electronic ATM facilities, remote ticketing, pre-paid mobile communications, and secure on-line payment mechanisms via the cellular telephone handset.

Using such a Dual Smart Card Phone users will, it is envisaged, be able to download electronic cash onto the Smart Card which will eliminate the inconvenience and potential hazards associated with travelling to a bank cash machine to access electronic funds or to make account transactions.

Users will also be able to use such a phone to pre-pay for air time as the air time is used, utilising cash debited from the Smart Card. Such a system has the advantage to service providers by maintaining low revenue customers on their billing systems and users avoid the risk of long-term service agreements. By pre-paying, users can switch services at will and are not hindered by a low credit rating. Pre-paying also renders possible hardware or software upgrades at any time and time may be booked from a local service provider instead of being charged a fee to roam.

Smart Cards may be also used for ticketing on public transport and leisure services.

The number of Smart Cards in circulation is growing at the rate of 30% per annum and the number of Smart Cards in circulation over the next five years is expected to increase to 3.85 billion, accounting for card sales of US$5 billion.

Smart Cards currently being used are contact, contactless or combination cards. Contact Smart Cards must be inserted into a Smart Card reader and have a contact plate on the face of the card which forms an electrical contact for reading from the chip or writing to the chip when the card is inserted into the reader.

Contactless Smart Cards have an antenna coil, as well as a chip embedded within the card. The internal antenna permits communication with a receiving antenna at the transaction point to facilitate transferal of information. Close proximity is required for such transactions which can decrease transaction time while increasing convenience.

A combination card functions as both a contact and contactless Smart Card.

Such Smart Cards often contain information which the user wishes to prevent access to by third parties. Hence, once the Smart Card has completed it's useful life it is often necessary to destroy the Smart Card to prevent it from being used by third parties. The customary manner of destroying such a Smart Card is, like a conventional credit card, to cut it into two or more portions such that the chip is destroyed.

The present invention seeks to provide a Smart Card which is more readily destroyed.

BRIEF DESCRIPTION OF THE DRAWINGS

The invention will now be described, by way of example, with reference to the accompanying drawing, which shows, in schematic form, a Smart Card in accordance with this invention.

DESCRIPTION OF THE PREFERRED EMBODIMENTS

According to this invention in its broadest aspect there is provided a Smart Card having an electronic circuit connected to a source of potential sufficient to destroy at least a portion of said electronic circuit when an interruptible connection, normally substantially short circuiting the connection between the source and the electronic circuit, is broken.

According to this invention there is provided a Smart Card including an electronic circuit connected to a source of potential having a voltage which is normally lower than a potential capable of destroying said electronic circuit, and means for increasing the potential applied to said electronic circuit from said source, whereby said portion of electronic circuit is destroyed.

Preferably, the potential source is normally short circuited and said means for increasing the potential from said source includes means for removing said short circuit.

In a preferred embodiment, the potential source is connected to said electronic circuit and to earth potential, and said means for removing said short circuit includes a frangible connection between said potential source and earth potential.

Advantageously, said frangible connection is formed by a removable portion of said card.

Conveniently, said removable portion is defined by a perforated corner of said card.

Referring to the drawing, a Smart Card 1 is formed of, for example, plastics material and is typically of the size and has the feel of a credit card, known per se although it is to be understood this invention is not limited thereto. Located within the body of the card is an integrated microprocessor chip 2 which is capable of storing data. For the purposes of this invention, it is irrelevant whether the card is a contact Smart Card, a contactless Smart Card or a combination card, and details of such connections are well known to those skilled in the art and will not be described herein.

The Smart Card contains an electronic circuit, where the microprocessor chip 2 is connected via an amplifier 3 to a source of potential 4 that is capable of destroying the chip. The source 4 is connected through a resistor 5 over a connection 6 to earth potential 7 so that the source 4 is normally short circuited.

In order to implement such an electronic circuit, surface mount, stripline, microstrip or similar enabling technology, or combination of such technologies as known in the art.

A corner portion 10 of the card has a frangible connection 11 formed, for example, by perforations. The frangible connection traverses the path of the connection 6.

In operation, when it is desired to destroy the microprocessor chip, the corner portion of the card 1 is broken along the frangible connection 11, thereby breaking the connection 6. Thus, the potential of source 4 is no longer short circuited to earth but open circuited and applied to the chip 2, thereby destroying the chip.

The frangible connection is so formed that the corner can be readily and easily removed by say, firm pressure of a user's hand. In the preferred embodiment of the invention the microprocessor chip 2 is a memory chip, for example an electrically erasable programme read only memory (EEPROM). It is to be understood that the EEPROM can be replaced by any electronic device or electronic circuit, whose functionality can be permanently terminated by electronic means, such as that described.

Thus a Smart Card is provided that can be more readily destroyed than with current Card technologies.

We claim:

1. A Smart Card comprising:

an electronic circuit;

a source of potential connected to said electronic circuit and having a voltage which is normally lower than a potential capable of destroying at least a portion of said electronic circuit;

an interruptible connection from the source and normally substantially short circuiting the connection between the source and the electronic circuit; and a frangible region in which the card is readily breakable by a user, the frangible region intersecting the interruptible connection to allow breaking of the interruptible connection by a user when the frangible portion is broken by a user to cause an increased potential to be applied to the electronic circuit, the increased potential large enough to destroy at least a portion of the electronic circuitry remaining on the card after the frangible region is broken.

2. A Smart Card as claimed in claim 1, wherein the source is connected to said electronic circuit to provide normally a voltage suitable to operate the electronic circuit but not capable of destroying the electronic circuit and the interruptible connection is connected between the source of potential and earth potential.

3. A Smart Card as claimed in claim 2, wherein said frangible region defines a removable portion of said card.

4. A Smart Card as claimed in claim 3, wherein said removable portion is defined by a perforated corner of said card.

5. A Smart Card comprising:

a housing;

an electronic circuit positioned in said housing;

a source of potential positioned in said housing and connected to said electronic circuit via a terminal, the source of potential providing one of a first potential and a second potential to the terminal, the first potential being below a threshold at which at least a portion of the electronic circuit will be destroyed and the second potential being above said threshold;

an interruptible connection for said source of potential said interruptible connection controlling the connection of one of said first and second potentials to said terminal; and a frangible region in said housing, the frangible region being readily breakable by a user, the frangible region intersecting the interruptible connection to facilitate breaking of the interruptible connection by a user to disconnect the supply of said first potential from said circuit, whereby when the frangible portion is not broken the first potential is supplied to the electronic circuit to permit full operation of said electronic circuitry and when said frangible portion is broken said second potential is provided to said terminal to destroy at least a portion of said electronic circuitry.

6. A Smart Card as claimed in claim 5, wherein the electronic circuit uses at least one of: surface mount technology, stripline technology or microstrip technology.

7. A smart card as claimed in claim 5, wherein the interruptible connection comprises a conductor connected between a voltage supply potential and ground, and wherein the frangible region overlies the conductor.

8. A smart card as claimed in claim 7, further including an amplifier having an input connected to said conductor, whereby the input of the amplifier is connected to ground until the conductor is broken.

9. A smart card as claimed in claim 8, further including a resistor connected between the voltage supply potential and the connector.

10. A Smart Card as claimed in claim 5, wherein said first potential is ground and breaking said interruptible connection breaks the connection of said terminal to ground causing said terminal to rise to said second potential.

11. A Smart Card as claimed in claim 5, wherein said first potential is ground and said source of potential further including a resistor connected between ground and a voltage source, and said interruptible connection between ground and said resistor.

12. A Smart Card as claimed in claim 11, further including an amplifier having an input and an output, the input connected to the junction of said interruptible connector and said resistor and the output connected to said terminal.

* * * * *